(12) United States Patent
Mazzilli

(10) Patent No.: US 6,795,111 B1
(45) Date of Patent: *Sep. 21, 2004

(54) 360° AUTOMOBILE VIDEO CAMERA SYSTEM

(76) Inventor: Joseph J. Mazzilli, 57-67 Cloverside Blvd., Bayside, NY (US) 11364

(*) Notice: Subject to any disclaimer, the term of this patent is extended or adjusted under 35 U.S.C. 154(b) by 0 days.

This patent is subject to a terminal disclaimer.

(21) Appl. No.: 10/261,606

(22) Filed: Sep. 30, 2002

Related U.S. Application Data

(63) Continuation-in-part of application No. 10/227,170, filed on Aug. 23, 2002, which is a continuation of application No. 10/186,544, which is a continuation-in-part of application No. 10/005,380, filed on Dec. 3, 2001, which is a continuation-in-part of application No. 09/494,060, filed on Jan. 28, 2000, now Pat. No. 6,333,759.

(60) Provisional application No. 60/124,624, filed on Mar. 16, 1999.

(51) Int. Cl.$^7$ .................................................. H04N 7/18
(52) U.S. Cl. .................... 348/148; 348/153; 348/118; 348/151; 348/159
(58) Field of Search ...................... 348/148, 153, 348/118, 151, 159, 36, 143; 224/556, 564, 563, 543; 396/429, 502; 352/131, 132; H04N 7/18, 9/47

(56) References Cited

U.S. PATENT DOCUMENTS

| | | | | | |
|---|---|---|---|---|---|
| 4,345,819 | A | * | 8/1982 | Villa-Real | 359/865 |
| 5,495,971 | A | * | 3/1996 | Holliday | 224/483 |
| 5,742,335 | A | * | 4/1998 | Cannon | 348/135 |
| 5,793,420 | A | * | 8/1998 | Schmidt | 348/148 |
| 6,002,326 | A | * | 12/1999 | Turner | 340/426.1 |
| 6,278,377 | B1 | * | 8/2001 | DeLine et al. | 340/815.4 |
| 6,294,989 | B1 | * | 9/2001 | Schofield et al. | 340/442 |
| 6,305,807 | B1 | * | 10/2001 | Schierbeek | 359/603 |
| 6,329,925 | B1 | * | 12/2001 | Skiver et al. | 340/815.4 |
| 6,353,392 | B1 | * | 3/2002 | Schofield et al. | 340/602 |
| 6,690,268 | B2 | * | 2/2004 | Schofield et al. | 340/438 |

* cited by examiner

*Primary Examiner*—Nhon Diep
(74) *Attorney, Agent, or Firm*—Richard B Klar

(57) ABSTRACT

The present invention relates to a video camera system which has a 360° range for digital video recording inside and outside of an automotive vehicle.

15 Claims, 4 Drawing Sheets

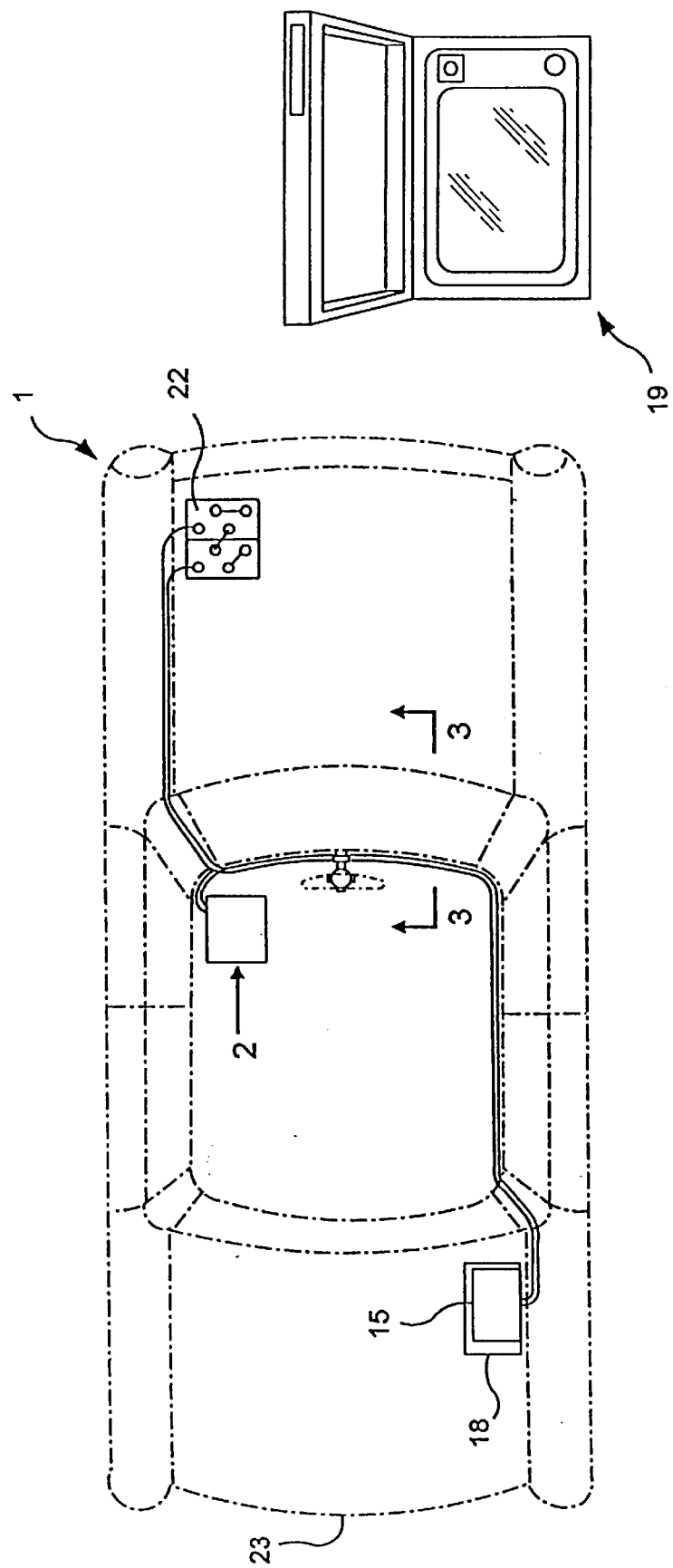

360° AUTOMOBILE VIDEO CAMERA SYSTEM

RELATED APPLICATION

The present application is a continuation in part application of U.S. patent application Ser. No. 10/227,170 filed on Aug. 23, 2002 which in turn is a continuation of U.S. patent application Ser. No. 10/186,544 filed on Oct. 17, 2002 and which in turn is a continuation in part application of U.S. patent application Ser. No. 10/005,380 filed on Dec. 3, 2001 which in turn is a continuation in part application Ser. No. 09/494,060 filed on Jan. 28, 2000 which has issued as U.S. Pat. No. 6,333,759 and which in turn is a continuation in part of Provisional U.S. Patent Application Serial No. 60/124,624 filed on Mar. 16, 1999 and for which priority is claimed under 35 USC 120.

BACKGROUND OF THE INVENTION

1. Field of the Invention

The present invention relates to a video camera system in an automobile. In particular the present invention relates to a video camera which has a 360° range for video recording inside and outside of an automotive vehicle and thereby providing documentation for police officers or vehicle owners.

2. The Prior Art

The use of videotaping systems for an automobile is known. U.S. Pat. No. 4,789,904 relates to a vehicle mounted surveillance system. The system has a camera and a control head inside a police vehicle and a video recorder in a bullet proof, fire proof vault of the vehicle.

The system is used as a surveillance system to videotape located in the trunk of a vehicle.

It would be preferred to have a system with a 360° range for video taping a 360° area simultaneously thus videotaping both inside and outside of the vehicle. It would be preferable to be able to retract the camera when not in use.

SUMMARY OF THE INVENTION

It is a principal object of the present invention to provide a video camera system for documentary videotaping in a 360° range around the camera's location.

It is another object to provide a 360° range camera to be located behind and underneath the rear view mirror of an automobile vehicle.

It is a further object to VCR (video-cassette recorder) for ready image.

It is another object to provide a commercial VCR system which operates off the automotive vehicle's battery.

It is still another object to locate the multiplexer and VCR either inside a glove compartment or a trunk of the automotive vehicle.

It is a further object to provide a video camera system which provides a 360 degree simultaneous video taping documentation for police officers to serve as evidence for appropriate situations when vehicles and/or individuals are within range of the police officer's vehicle.

It is still another object to provide a video camera system which provides a 360 degree simultaneous video taping documentation for vehicle owners to serve as evidence of vehicle theft or police abuse that occur within range of the owner's vehicle.

It is yet another object to provide a video camera system which provides a 360 degree simultaneous video taping documentation for vehicle owners to serve as documentation of accidents and injuries and for related insurance purposes therefor that occur within range of the owner's vehicle.

Other objects will become readily apparent from the foregoing description and accompanying drawings in which:

BRIEF DESCRIPTION OF THE DRAWINGS

FIG. 1 is a top view of the present invention;

FIG. 2 is a view of the monitor along line 2 of FIG. 1;

DETAILED DESCRIPTION OF THE PREFERRED EMBODIMENTS

Figure 3:
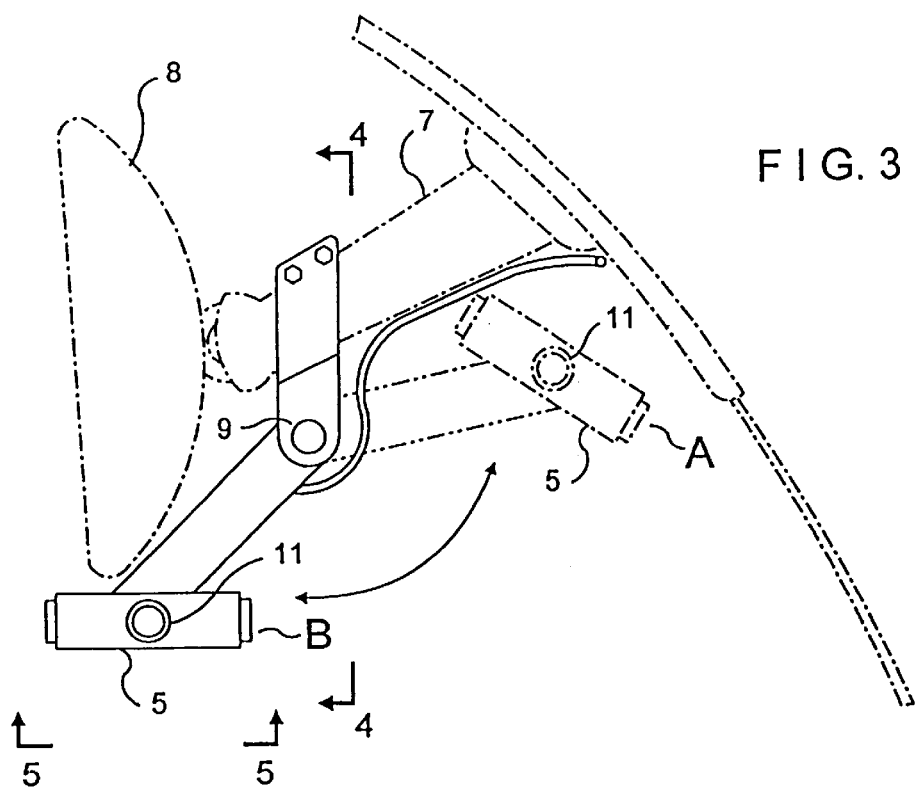
FIG. 3 is a partial sectional view along lines 3—3 of FIG. 1.

Referring to the drawings, FIG. 1 shows a top view of the invention, a 360 degree video camera system inside of an automotive vehicle 1. The 360 degree camera system includes a camera housing 5, a multiplexer unit 15 and a video cassette recorder (VCR) 18 and optionally a monitor 19, as shown in FIGS. 1 and 2.

The camera housing 5, as shown in FIG. 3, can be mounted on the supporting mount 7 of the rear view mirror 8 of the automotive vehicle 1. As shown in FIG. 3, the camera housing 5 can be moved so that it can be retracted and placed behind the rear view mirror 8 in position A when not in use or extended below the rear view mirror 8 in position B when in use. A hinge mechanism 9 can articulately move the camera on its mount from position A to position B and vice verse. Alternatively other mechanical arrangements might be employed such as having the camera mount designed as a telescopic rod for extending and retracting the camera behind or below the rear view mirror respectively.

The camera housing 5 is preferably formed to accommodate a 4 Board CCD or a PC51 Series CMOS inline Microvideo Camera sold by Super Circuits, Inc., Leander, Tex., which is mounted on a 1 inch to 2 inch mount giving it a 360 degree view inside and outside the vehicle. These miniature video cameras can be black and white or color cameras. It is understood, however, that any other miniature camera system can be used and the invention is not limited to these specific examples.

There is a swivel unit for the camera housing 5 which attaches to the rear view mirror.

The system includes preferably a 5 inch or 6 inch LCD video monitor for viewing the camera recorded images (FIG. 2). The monitor can be color or black and white and can flip up or down.

Wires run from the camera housing to the multiplexer which records with time and date, either in color or black and white, all four miniature video cameras at the same time. Then the wires run into a VCR which along with the miniature video cameras and multiplexer operate off the vehicle's battery 22, preferably by a wire harness (not shown) to which the wires for the miniature cameras, the multiplexer 15 and the VCR 18 run and from which the wire harness connects to the vehicle's battery 22.

Figure 4:
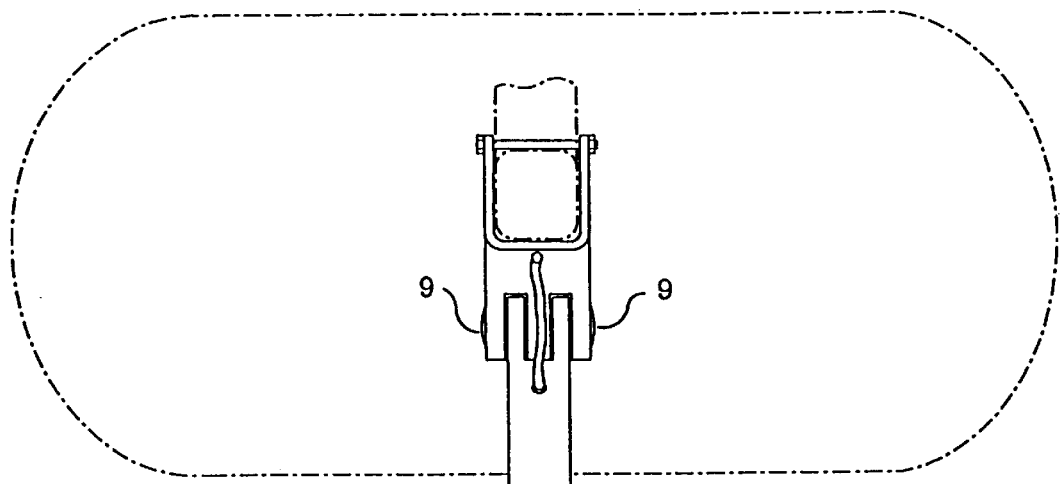
FIG. 4 is a partial sectional view of line 4—4 of FIG. 3.
Figure 5:
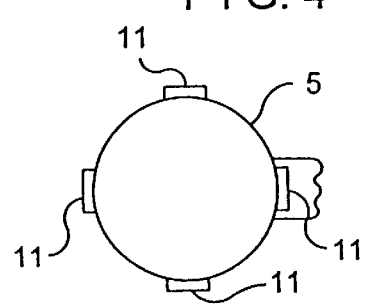
FIG. 5 is an alternative embodiment of the invention in which the camera has a circularly-shaped housing.
Figure 6:
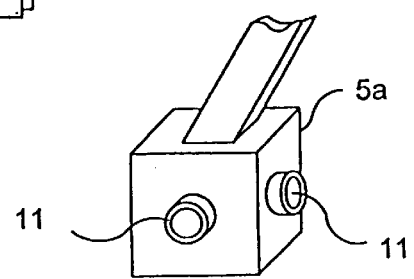
FIG. 6 is another alternative embodiment of the present invention in which the camera has a cube-shaped housing.

Preferably, the camera housing 5 can be configured into any geometric shape and is not limited to the shapes described herein. FIGS. 3–5 shows the camera housing as a ring shaped or circular housing with lenses on each side. Preferably four miniature video cameras are provided on each side of the housing spaced 90 degrees apart but the number of cameras 11 can vary if desired. The miniature video cameras 11 provide the camera housing 5 with a 360 degree range for video recording everything around the camera housing 5, namely the interior of the automotive vehicle and the exterior of the automotive vehicle by recording through the windshield, side and rear windows of the automotive vehicle 1. The camera housing 5 and cameras 11 can run off the automotive vehicle's battery as shown in FIG.1.

The system includes a multiplexer 15 and a VCR 18. The multiplexer 15 permits all the recorded view from each camera 11 of the camera housing 5 to be placed together to provide a 360 degree picture. Thus in a four-camera arrangement, the multiplexer 15 provides for the four cameras' images to be placed side by side by side by side for display as recorded in the VCR 18 and displayed in the monitor 19. The VCR 18 records these images. One suitable multiplexer 15 for the present invention is Model No. DPX4 for color video taping and Model No. MX4M for black and white video taping available from Advanced Technology Video Inc. of Redmond, Wash. Of course the present invention is not limited to any one particular multiplexer model.

The multiplexer 15 and the VCR 18 are placed together and preferably stacked one on top of the other either in the trunk 22 of the automotive vehicle as shown in FIG. 1 or in the glove compartment of the automotive vehicle (not shown).

The wiring between the camera housing 5, the multiplexer 15 and VCR 18 and optionally the monitor 19 can be placed behind the panels of the sidewalls, roof and dashboard of the vehicle as shown in FIG. 1 to keep the installation of the present invention less intrusive and the wiring concealed for aesthetic appearances. The monitor 19, VCR 18 and the multiplexer 15 can also run off the automotive vehicle's battery 22. Thus, preferably, all four video cameras 11, the multiplexer 15 and the VCR 19 have wires running to a wire harness which is connected to the vehicle's battery 22. Alternatively any other power supply can be provided such as batteries for the camera, multiplexer and VCR.

Alternatively, the camera housing 5 can be part of the housing of the rear view mirror. In other words, the camera housing can be incorporated or built into the housing of the rear view mirror(See the embodiment described below with reference to FIGS. 7–10).

In another embodiment(not shown), the miniature video camera can be a miniature digital camera and instead of a multiplexer unit and a VCR, the miniature digital camera would be wired into digital recording system. The digital recording system would be located in either the glove compartment or the trunk in place of the multiplexer unit and the VCR and similarly the miniature digital camera would be located as described for the location of the camera and camera housing 5 herein. Examples of digital video cameras that can be used in the present invention include but are not limited to JVC DVM 90 and Sony DCRPC 9. Examples of digital video cameras that can be used include but are not limited to Sony GVD 300, Sony GVD 600 and Mobil view II Digital Recorder.

Figure 7:
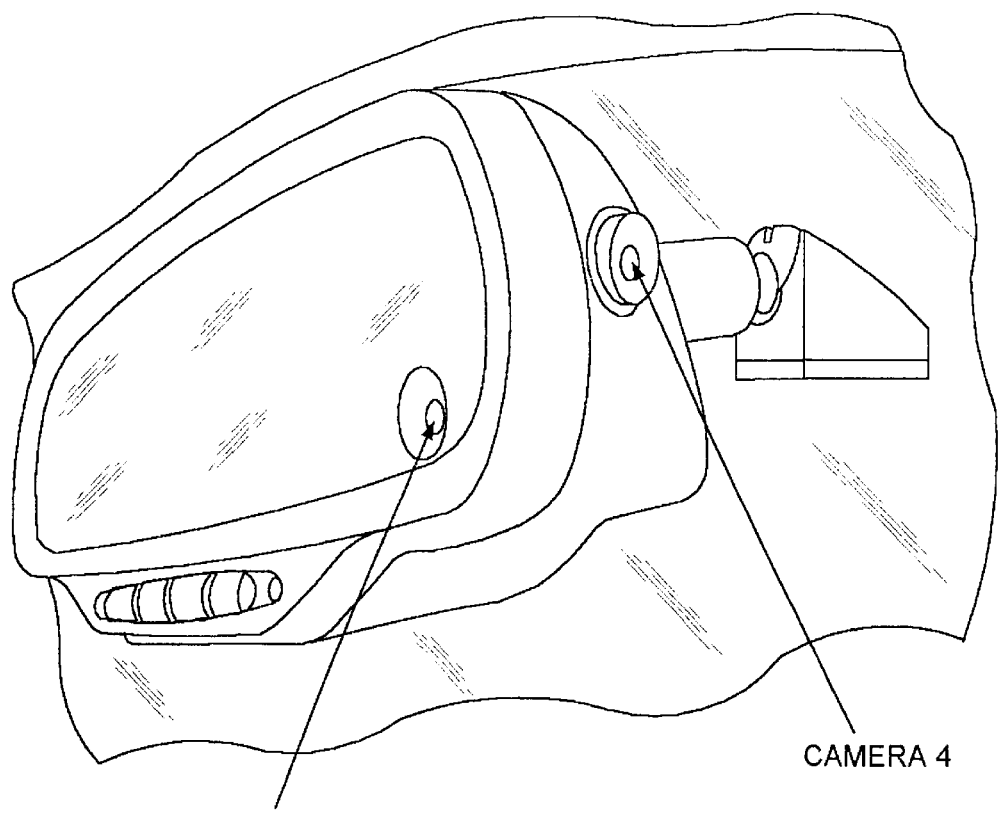
FIG. 7 is another alternative embodiment of the present invention in which each of four cameras can be built into the mirror or mirror housing of the rear view mirror on different sides of the mirror so as to provide a three hundred and sixty degree view around the rear view mirror.
Figure 8:
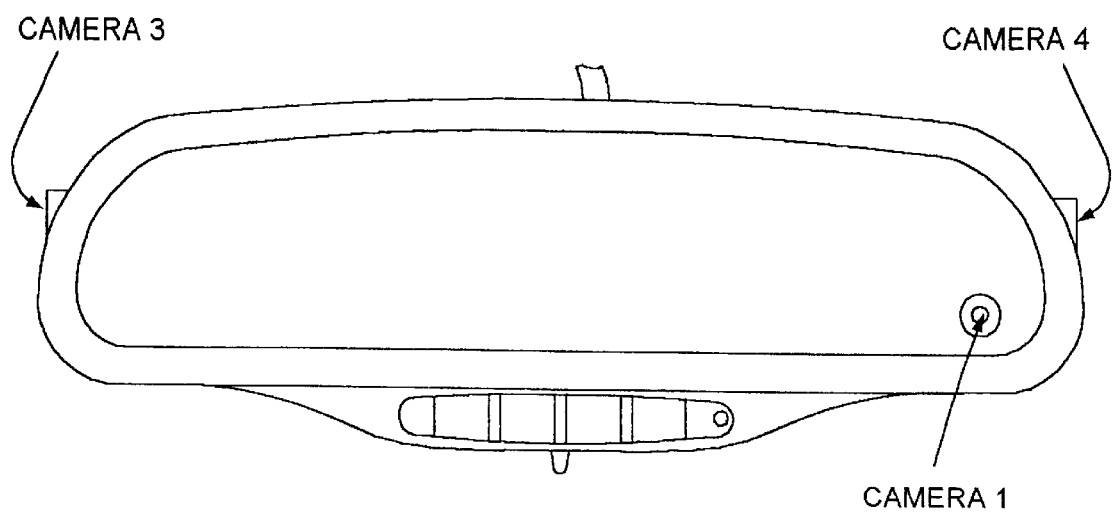
FIG. 8 is a front view of the embodiment of FIG. 7 in which a camera (camera 1 is built into the front surface of the rear view mirror and two other cameras (cameras 3 and 4 are built into opposite side surfaces of the rear view mirror.
Figure 9:
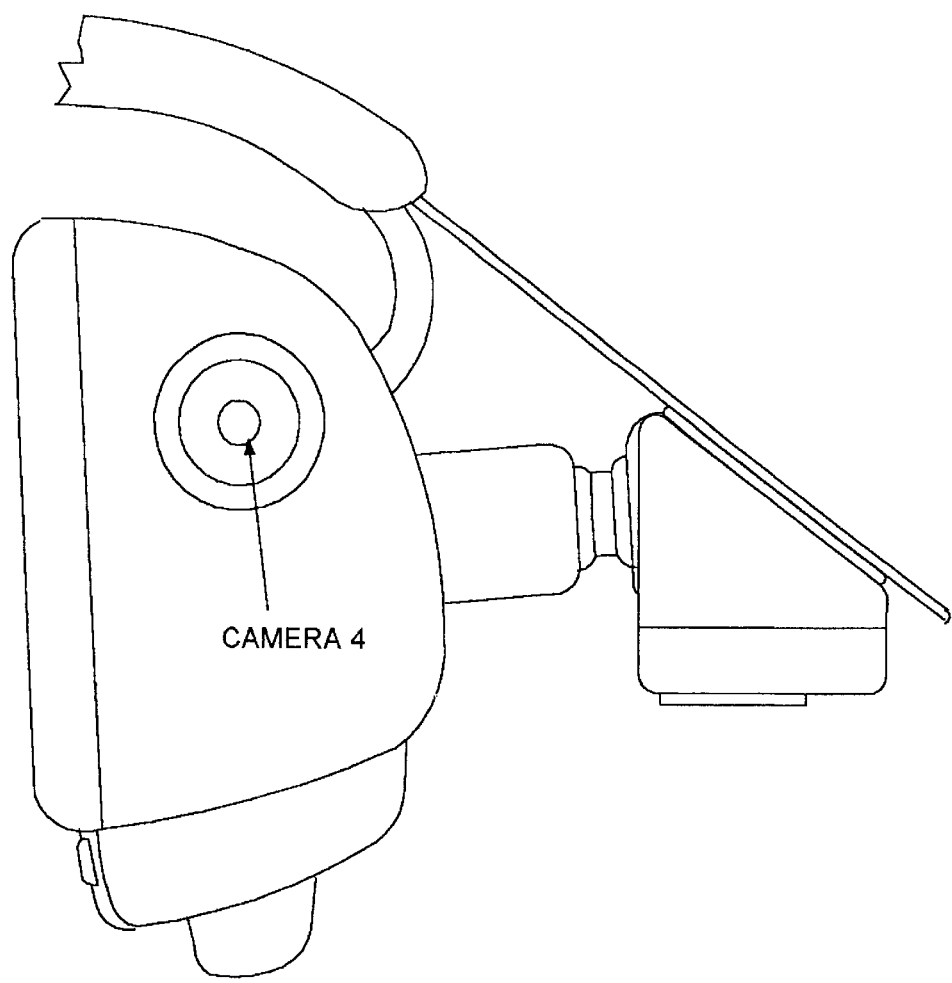
FIG. 9 is a side view of the embodiment of FIG. 7 showing camera 4 built into the side surface of the rear view mirror.
Figure 10:
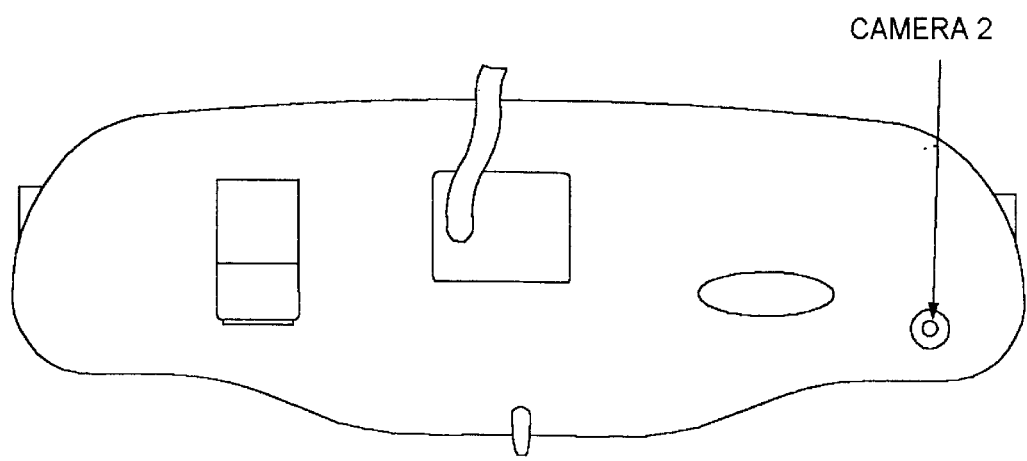
FIG. 10 is a rear view of the embodiment of FIG. 7 showing a camera (camera 2) built into the rear surface of the rear view mirror.

In still another embodiment of the present invention a miniature 4 camera system can be built into the rear view mirror or its housing. As shown in FIGS. 7–10 four cameras (cameras 1, 2, 3 and 4) are built into the rear view mirror. As seen in FIG. 7 Camera 1 is built into the front surface of the rearview mirror and cameras 3 and 4 are built into the opposite side surfaces of the rear view mirror(see FIGS. 8 and 9). FIG. 10 illustrates that another camera, camera 2 is built into the rear side of the rear view mirror. Thus the four cameras built into the rear view mirror provide for a three hundred and sixty degree viewing around the rear view mirror. Further a monitor can be installed and attached to the rear view mirror which can flip down from the mirror for viewing. It is understood that the present invention is not limited to the number of cameras shown or the specific locations illustrated in the drawings. Alternately, the monitor can be located elsewhere in the automotive vehicle (not shown). One or more of these miniature camera system are custom designed by SVS (Subsea Video Systems, Inc.) Having an address in Elizabeth City, N.C. These miniature camera system has the following specifications:

Miniature 4 day/night cameras, rear view mirror, in car video system externally mounted-clip-on version with a 480 lines of high resolution, flip down color LCD view screen (the flip down monitor) with camera switcher (1–5 cameras): Pickup element: 1/3" CCD, Snc: Internal; AGC: Automatic; Video Output: Composite (1vp-p); white balance: automatic; minimum illumination: 0.3 lux., 0.0 lux; voltage: 10–16 V DC, 150 mA; Dimensions: 1.75 Dia.×2.5 inches Lg.; Weight: 154 grams; shock: Above 1000 g; Temperature: −40 degrees C. to +50 degrees C.; Lens face: Pyrex tempered.

A high resolution 16×color zoom camera is also being custom built by SVS for the present invention with the following specifications:

This high resolution color day/night camera offers a remote controlled motorized or manual zoom lens with a 16 ×zoom o 3.9 to 54.6 mm. The lens also incorporates an auto focus feature thereby minimizing control functions. The remote zoom control unit is also included with the camera. As with all our cameras the AV-Z is waterproof and rated to our minimum specification of 300 foot water depth. The micro lens motors do not allow for 1000 g shock levels but with our specialized camera hardening techniques it can still achieve an impressive 150 g continuous shock at 0.5 millisecond, still exceeding any other standard video camera specifications. An optional RS-232 serial data port is available for full computer control with over 10 controllable functions. This system provides for a true harsh environmental video camera.

The specifications for this camera system include:

Pickup element:1/4" CCD, Snc: Internal; AGC: Automatic; Video Output: Composite (1vp-p); white balance: automatic; minimum illumination: 0.01 lux.; voltage: 10–16 V DC, shock: 150 g; Temperature: −40 degrees C. to +50 degrees C.; Lens face: Pyrex tempered.

A further embodiment which may utilize the camera systems such as those which are being custom built by SVS manufactured utilizes a DVR or digital video recorder as the digital recording system and does not require a multiplexer in the present invention. The camera system can either be wired for transmission to the DVR or can communicate with the DVR by wireless transmission. The DVR can be located in the automotive vehicle or at a remote location from the automotive vehicle so that the camera system can communicate with the DVR by wireless transmission. Again one version of this DVR is being custom built by SVS as a portable/mobile video recorder having the following features; broadcast quality MPEG 1 and 2 recording, 1–5 cameras, 30 FPS; Programable e video compression for, optimum recording; 1 channel audio recording with wearable , wireless microphone (600' transmission from car); instant replay of 1–5 cameras while still recording; compatible with NTSC or PAL; simple VCR like wearable wireless remote operation; computer/Internet accessible with secure password protection and up to 30 days recording with the aforementioned camera systems being custom built by SVS. The specifications include:
ISO/IEX 13188-3,2 (MPEG-2); Stream Types: Elementary, Program and Transport., Half PEL accuracy; Video Encoder: Horizontal Resolution-720,640,480,320,160; Vertical Resolution-480,240,112 (NTSC), 576,288,144 (PAL); Preprocessor: programmable 2D (7×6) filter spatial noise reduction; Motion Estimation: P and B-pictures +/−100 (H) X +/−34 (V); Inputs: (a) Composite Video: 1x, Input Impedance: 75 Ohm, 1.0 Vp-p Standards 525/60 (NTSC), 625/50 (PAL); Audio: 1x; Balanced Level—Up to 3V p-p.

Although the invention is described in particular for use in automotive vehicles, it can also be utilized in other vehicles involving but not limited to aircrafts, boats, trains, etc.

While presently preferred embodiments have been described for purposes of the disclosure, numerous changes in the arrangement of method steps and apparatus parts can be made by those skilled in the art. Such changes are encompassed within the spirit of the invention as defined by the appended claims.

What is claimed is:

1. A video system for an automotive vehicle, comprising:
   a camera housing located inside an automotive vehicle including a plurality of cameras, located on each side of said housing, each of said cameras being stationarily mounted to said housing to provide a 360° range for simultaneous video recording images received by said cameras, said camera housing being incorporated into a rear view mirror of said vehicle;
   a recording system for recording all recorded images received from said cameras thereby providing a recording of a 360° environment surrounding said camera housing.

2. The video system according to claim 1 wherein said camera s transmit said recorded images to a digital video recorder by wireless transmission.

3. The video system according to claim 1 wherein said camera s transmit said recorded images to said digital video recorder by wired transmission.

4. The video system according to claim 1 wherein said digital video recorder is located inside said automotive vehicle.

5. The video system according to claim 1 wherein said digital video recorder is located remote from said automotive vehicle.

6. The video system according to claim 1 further comprising a flip down monitor attached to the rear view mirror for displaying said recorded images.

7. The video system according to claim 1 wherein said camera housing is shaped circularly and each of said cameras is located 90 degrees apart from each other.

8. The video system according to claim 1 wherein said camera housing is cube shaped and each side surface of said cube shaped camera housing has a lens therein.

9. The video system according to claim 1 wherein said digital video recorder is located in a glove compartment inside said automotive compartment.

10. The video system according to claim 1 wherein said digital video recorder is located in a trunk of said automotive vehicle.

11. The device according to claim 1 wherein said plurality of cameras are built into said rear view mirror so that said rear view mirror is said camera housing for said cameras.

12. A method for digital video recording within an automotive vehicle, the steps comprising:
   locating a camera housing inside an automotive vehicle including a plurality of cameras located on each side of said housing, each of said cameras being stationarily mounted to said housing, to provide a 360° range for simultaneous video recording images received by said cameras, said camera housing being part of a housing of a rear view mirror of said vehicle;
   recording images by means of a recording system thereby providing a recording of a 360° environment surrounding said camera housing.

13. The method according to claim 12 wherein said plurality of cameras are built into said rear view mirror so that said rear view mirror is said camera housing for said cameras.

14. The system according to claim 1 wherein at least one of said cameras is a zoom camera.

15. The method according to claim 12 wherein at least one of said cameras is a zoom camera.

* * * * *